United States Patent Office 3,101,328
Patented Aug. 20, 1963

3,101,328
POLYMERIZATION OF OLEFINS AND CATALYSTS THEREFOR
James T. Edmonds, Jr., Bartlesville, Okla., assignor to Phillips Petroleum Company, a corporation of Delaware
No Drawing. Filed Mar. 23, 1955, Ser. No. 496,340
6 Claims. (Cl. 260—93.7)

This invention relates to a method for polymerizing olefins. In another aspect, this invention relates to a novel catalyst composition for the polymerization of olefins.

A variety of reactions and processes for the polymerization of olefins are known in the art and are generally carried out in the presence of catalysts. One type of polymerization reaction for olefins, which has been taught recently by the prior art, employs an organometal compound, e.g., triethylaluminum, as a catalyst for the polymerization of ethylene. Another catalyst system which has been employed to prepare polymers of ethylene comprises a mixture of a metal such as magnesium or zinc and a halogen compound such as ethyl bromide. Each of these types of catalytic processes for polymerizing olefins has its own peculiar disadvantages, however. In the first type of reaction mentioned, the polymer produced is usually a relatively low molecular weight polymer. In the latter system mentioned above, relatively high temperatures and pressures are necessary in order to produce a polymer of ethylene. For example, it has been necessary to employ a pressure of 12,600 to 14,000 p.s.i.g. and a temperature of 302° F. when employing ethyl bromide and magnesium turnings as the catalyst system for polymerizing ethylene. It is an object of this invention, therefore, to provide a novel polymerization method and catalyst therefor which produce a solid polymer of an olefin economically at low temperatures and pressures.

It is a further object of this invention to provide a novel catalyst for polymerizing olefins.

It is a still further object to provide a method and a catalyst for the method which permits olefins to be polymerized to solid or liquid polymers at lower temperature and pressures than have been employed in the process of the prior art. I have found that the foregoing and other objects are attained by polymerizing an olefin in the presence of a novel catalyst comprising an organic halide, a halide of a Group IV metal and at least one metal selected from the group consisting of sodium, potassium, lithium, rubidium, cesium, beryllium, magnesium, zinc, cadmium, mercury, aluminum, gallium, indium and thallium. I have found that olefins are polymerized to solid or liquid polymers at satisfactory reaction rates in the presence of lower temperatures and pressures than have been utilized in the processes of the prior art upon being contacted with my novel catalyst composition. The polymerization process of my invention can be carried out as a batch or a continuous process with excellent yields of polymers of olefins produced thereby.

As was stated above, my novel catalyst composition comprises an organic halide, including chloro-, bromo-, iodo- and fluoro-substituted organic halides. These organic halides can be mono-, di-, tri- or tetra-substituted organic halides. Within the broad class of organic halides which is a component of my novel catalyst composition, the class of halides defined as monohalogen-substituted hydrocarbons having up to and including 8 carbon atoms per molecule are preferred since they are more easily handled in a commercial operation and are active to initiate the polymerization of olefins in the catalyst composition of this invention. Still more preferably, the organic halide which is used in the catalyst is a lower alkyl monohalide having up to and including 8 carbon atoms per molecule. Examples of these organic halides which can be used in the catalyst are ethyl bromide, propyl chloride, butyl iodide and pentyl fluoride. Other examples are 1,2-dibromoethane, 1,3-dibromopropane, 1,2,3-tribromopropane, 1,2,3-trichloropropane, 1,1-difluoroethane, 1,4-diiodobutane, chloroform and carbon tetrachloride. Other acyclic and cyclic halides as well as aromatic halides can be employed also. Examples of these are 1,3-dichlorocyclohexane, benzyl chloride, 1,4-dichlorobenzene, 1-bromodecane, 1-chlorododecane, 2-chlorooctane, 2-chloro-4-methyloctane, cyclopentyl chloride, 1-chloro-3-phenylpropane, 1-bromo-3-phenylhexane, cyclohexyl chloride and phenyl chloride.

The Group IV metal halide which is used in the catalyst composition of this invention is a tri- or a tetrahalide of a Group IV (Mendelyeev's Periodic System) metal. These halides can be used in the catalyst composition individually or as mixtures of Group IV metal halide. Any or all of the Group IV metals can be used, including titanium, silicon, thorium, zirconium, tin, lead, hafnium, germanium, and cerium. The expression "Group IV metal," when used in this specification and the appended claims, is defined as meaning any or all of the foregoing elements and silicon is defined as a Group IV metal for these purposes. Tri- and tetrachlorides, tri- and tetrabromides, tri- and tetraiodides and tri- and tetrafluorides of the Group IV metals are all useful in the catalyst composition of this invention. Examples of these halides of Group IV metals are titanium tetrachloride, titanium tetrabromide, titanium trichloride, titanium tribromide, titanium trifluoride, silicon tetrachloride, silicon tetrabromide, silicon tetraiodide, zirconium tetrachloride, zirconium tetrabromide, tin tetrachloride, tin tetrabromide, lead tetrachloride, germanium tetrachloride, germanium tetrabromide, and the like.

As was indicated above, the final component of my catalyst is a metal, such as sodium, potassium, lithium, rubidium and cesium of Group I, beryllium, magnesium, zinc, cadmium and mercury of Group II and aluminum, gallium, indium and thallium of Group III of the Periodic Table. Each of these metals can be used in the catalyst individually, or mixtures of these metals can be used. The metals are used in the form of shavings or turnings or as a powder of the metallic elements themselves.

Obviously, many combinations of the organic halide, Group IV metal halide and metal of Groups I, II or III set forth above, can be used in the catalyst composition of this invention. The preferred catalyst compositions of this invention are a mixture of ethyl bromide, magnesium and titanium tetrachloride; a mixture of ethyl bromide, aluminum, magnesium and titanium tetrachloride; a mixture of ethyl bromide, aluminum and titanium tetrachloride; a mixture of ethyl bromide, sodium and titanium tetrachloride; and a mixture of ethyl bromide, magnesium and titanium tetrabromide.

The amount of the catalyst composition of this invention which is used in the polymerization of olefins can vary over a wide range. Relatively small amounts of the catalyst provide the desired activating effect when the polymerization reaction is carried out as a batch process with continuous addition of the olefin as the polymerization reaction occurs. When a continuous flow system is employed, the concentration of the total catalyst composition is usually in the range from 0.01 weight percent to 1.0 weight percent, or higher. The ratio of the amounts of organic halide, metal and Group IV metal halide in the catalyst composition is usually in the range of 0.02 to 50 mols of the organic halide per mol of the Group IV metal halide and from 0.02 to 50 mols of the metal per mol of the Group IV metal halide. A preferred range of the ratio of the amounts of the components of the catalyst is from 0.2 to 5 mols of organic halide per mol of the Group IV metal halide and from 0.2 to 5 mols of the metal per mol of the Group IV metal halide.

The materials which are polymerized, in accordance with this invention, are polymerizable hydrocarbons, broadly. Preferably, the polymerizable hydrocarbons are olefins containing a $CH_2=O<$ radical. The most preferred class of polymerizable hydrocarbons used is 1-olefins having up to and including 8 carbon atoms per molecule. Specifically, the normal 1-olefin, ethylene has been found to polymerize to a polymer thereof upon being contacted with the catalyst composition of this invention at lower temperatures and pressure than have been used in the processes of the prior art mentioned above. Examples of other polymerizable hydrocarbons which can be used in the process of this invention are propylene, 1-butene, 1-hexene and 1-octene. Branched chain olefins can also be used, such as isobutylene. Also, 1,1-dialkyl-substituted and 1,2-dialkyl-substituted ethylenes can also be used. Examples of the di- and polyolefins in which the double bonds are in non-conjugated positions and which can be used in accordance with this invention are 1,5-hexadiene, 1,4-pentadiene, and 1,4,7- octatriene. Cyclic olefins can also be used, such as cyclohexene. Mixtures of the foregoing polymerizable hydrocarbons can be polymerized to a solid polymer in the presence of our novel catalyst as, for example, by copolymerizing ethylene and propylene, ethylene and 1-butene, propylene and 1-butene, or propylene and a pentene. Also, aryl olefins, e.g., styrene and alkyl-substituted styrenes can be polymerized to a solid polymer in the process of this invention.

The remarkable feature of my method and the use of my catalyst resides in the lower temperatures and pressures which can be used in the process to produce polymers of olefins. The temperature can be varied over a rather broad range since my catalyst is extremely active. Temperatures in the range of 100 to 500° F. can be used and the temperature of the process is preferably from 200 to 350° F. Although pressures ranging from atmoshperic up to 20,000 or 30,000 p.s.i.g., or higher, can be empolyed, a pressure in the range from 100 to 15,000 p.s.i.g. is satisfactory with the active catalyst of this invention. The pressure which is usually used is in the range from 100 to 500 p.s.i.g.

In this connection, it is noted that it is preferred to carry out the reaction in the presence of an inert, organic hydrocarbon diluent with a pressure sufficient to maintain the diluent in the liquid phase, giving rise to a so-called "mixed-phase" system. However, the polymerization process of this invention proceeds in the gaseous phase without a diluent. The preferred pressure range set forth above has been found to produce solid polymers of olefins in excellent yields.

Suitable diluents for use in the polymerization process are paraffins, cycloparaffins and/or aromatic hydrocarbons which are relatively inert, nondeleterious and liquid under the conditions of the process. The lower molecular weight alkanes, such as propane, butane, and pentane, are especially useful when the process is carried out at low temperatures. However, the higher molecular weight paraffins and cycloparaffins, such as isooctane, cyclohexane, methylcyclohexane, and aromatic diluents, such as benzene, toluene, and the like, can also be used, particularly when operating at higher temperatures.

The process of this invention can be carried out as a batch process by pressuring the olefin into a reactor containing the catalyst and diluent, if the latter is used. Also, the process can be carried out continuously by maintaining the above-described concentrations of reactants in the reactor for a suitable residence time. The residence time used in a continuous process can vary widely, since it depends upon the temperature at which the process is carried out to a great extent. The residence time also varies with the specific olefin that is polymerized. However, the residence time for the polymerization of aliphatic monoolefins, within the preferred temperature range of 200 to 350° F., falls within the range of one second to an hour or more. In the batch process, the time for the reaction can vary widely, also, such as up to 24 hours or more.

Various materials are known to be poisons for the catalyst composition of this invention. These materials include carbon dioxide, oxygen and water. Therefore, it is usualy desirable to free the polymerizable hydrocarbon from these materials, as well as from other materials which tend to inactivate the catalyst before contacting the hydrocarbon with the catalyst. Any of the known means for removing such contaminants can be employed. When a diluent is used in the process, this material should be freed of contaminants, such as water, oxygen, and the like. It is desirable, also, that air and moisture be removed from the reaction vessel before the reaction is carried out.

At the completion of the polymerization reaction, the catalyst is killed or inactivated by any suitable means and the olefin polymer is separated from the diluent if such was used, and from the metal turnings or powder which may remain in the reactor. The polymer is then washed with a suitable polymer decolorizing material, such as an alcohol or water, and then is dried. When the process of the invention is carried out continuously, the polymer, diluent and catalyst system are pumped out of the reactor, the catalyst is treated with a catalyst-inactivating material, such as an alcohol, the diluent and alcohol are separated from the polymer and the polymer is then dried to provide the desired polymeric product.

The catalyst system of this invention can be used to prepare relatively high molecular weight solid polymers of olefins, such as ethylene, as well as lower molecular weight products in the normally liquid range. Specifically, it has been found that normally liquid polymers are produced when the metal used in the catalyst composition of my invention is aluminum.

The following examples and data are supplied to illustrate the process and polymer which is obtained, in accordance with this invention and should not be used to unduly restrict the scope of the invention as set forth in the foregoing description.

EXAMPLE I

The polymerization of ethylene was carried out under the following conditions in a stainless steel rocking autoclave of 1200 cubic centimeter capacity. Four hundred milliliters of benzene (which had been distilled from sodium) was charged to the autoclave, maintaining a nitrogen blanket in the autoclave. To this was added 7.1 grams of ethyl bromide, 0.59 gram of aluminum turnings, 1.6 grams of magnesium powder and 0.569 gram of titanium tetrachloride. Ethylene which had been purified by passage through pyrogallol, sodium hydroxide and drying to remove carbon dioxide, oxygen and water vapor was then pressured into the autoclave at 70° F. to a pressure of 300 p.s.i.g. The autoclave was then heated up gradually over a period of about two hours and 40 minutes to a temperature of 290° F. and 650 p.s.i.g. pressure. At this point the polymerization reaction was initiated. The temperature was then held at 275° to 330° F. for about one hour and 40 minutes and the pressure was maintained in the range of 100 to 500 p.s.i.g. by pressuring in ethylene periodically as necessary. At the end of this reaction period the reactor was cooled and vented and about 100 milliliters of isopropyl alcohol was added. A dark-colored solid polymer, which was present as a suspension in the mixture of benzene and alcohol, was obtained. This material was decanted from the aluminum turnings, which remained in the bottom of the autoclave. The suspension was warmed on the steam bath for about one-half hour, was removed from the steam bath, and was diluted with about 500 milliliters of methyl alcohol. This suspension of solid polymer was stirred in a Waring Blendor for about 5 minutes and then the finely divided product was recovered by filtration. The powder which was obtained was gray in color. One-half of the grey-colored polymer was washed with about 250 milliliters of water, which contained 5 milliliters of concentrated hydrochloric acid. A white powder was recovered by filtration from the aqueous phase. The second portion was treated in the same manner and the total polymer was then washed twice with water to remove any water-soluble salts. The product was finally washed with methyl alcohol and dried in air for approximately 18 hours. About 54 grams of a finely divided white polymer of ethylene was obtained as the product.

The polymer produced in the process of Example I was compression molded and had the properties listed below in Table I.

*Table I*

| | |
|---|---|
| Density at room temperature (approximately 78° F.) gr./cc. | 0.959 |
| Tensile strength, p.s.i., pulled at 20 in./min. | 3265 |
| Elongation, percent, pulled at 20 in./min. | 48 |
| Melting point ° F. | 247 |
| Flex temperature ° F. | −32 |
| Hardness "Shore D" | 64 |
| No strength temperature, ° F. | 275 |
| Stiffness (flexure), p.s.i. | 61,800 |
| Ash, percent | 0.853 |
| Crystallinity, percent [1] | 72 |

[1] Based on infrared spectrum of polymer.

EXAMPLE II

Ethylene was polymerized using the same procedure as described in Example I. In this example the catalyst comprised 7.1 grams of ethyl bromide, 1.6 grams of magnesium turnings, and 0.569 gram of titanium tetrachloride in 400 milliliters of benzene as the diluent. Ethylene, purified as described in Example I, was pressured into the autoclave at 75° F. to a pressure of 200 p.s.i.g. The autoclave was heated and when the temperature reached about 275° F. and the pressure was about 475 p.s.i.g. the polymerization was initiated. The temperature was gradually increased to 340° F., at which point the pressure was 500 p.s.i.g. No additional ethylene was added to the autoclave but the closed system was allowed to continue to rock for 18 hours and 35 minutes, at which time the temperature was 260° F. and the pressure was less than 100 p.s.i.g. The autoclave was cooled and vented and isopropyl alcohol was added to kill the catalyst. A suspension of gray-colored polymer of ethylene in the benzene and alcohol was obtained. This suspension was decanted from the magnesium turnings, which remained in the bottom of the autoclave. On exposure to air the polymer lost its gray color, turning white. The solid polymer was recovered from the suspension by filtration; was washed with water; and was filtered again. The polymer was dried in a vacuum oven at 50° C. for about one hour and was allowed to air dry for an additional 18 hours. About 49 grams of a white, finely-divided polymer was obtained.

The polymer produced in the process of Example II was compression molded and had the properties listed below in Table II.

*Table II*

| | |
|---|---|
| Hardness, Shore D | 60 |
| Melting point, ° F | 250 |
| Density at 78° F., gr./cc | 0.967 |
| Melt index | 9.380 |
| Molecular weight based on melt index value | 26,150 |
| Inherent viscosity | 0.8585 |
| Molecular weight based on inherent viscosity [1] | 19,800 |
| Weight percent ash | 0.594 |

[1] The molecular weight was estimated from the inherent viscosity value, obtained with a concentration of 0.2 gram of polymer per 100 cubic centimeters of tetralin solvent at 130° C.

EXAMPLE III

The polymerization of ethylene was carried out in a manner similar to that described in Example I. The catalyst comprised 7.1 grams of ethyl bromide, 0.59 gram of aluminum turnings, and 0.569 gram of titanium tetrachloride. After adding ethylene to the autoclave it was gradually heated to a tempearture of about 320° F., at which point the pressure was about 750 p.s.i.g. At this time the polymerization was initiated and a very rapid reaction occurred. Within the next four minutes the temperature increased to 370° F. and the pressure dropped to about 100 p.s.i.g. The autoclave was repressured to 300 p.s.i.g. with ethylene and the temperature rose to 400° F. At the end of the next 11 minutes the pressure had dropped to less than 100 p.s.i.g. and the temperature decreased to about 350° F. The autoclave was cooled and vented and isopropyl alcohol was added to the autoclave to kill the catalyst. This mixture was decanted from the aluminum turnings, which remained in the bottom of the autoclave. The benzene and alcohol were evaporated and a dark-colored fluid polymer was obtained as the product.

EXAMPLE IV

Ethylene was polymerized in the presence of a catalyst composition described below in the same rocking autoclave and using the same general charging procedure and ethylene purification procedure as described in Example I. The catalyst comprised 7.1 grams of ethyl bromide, 2.58 grams of sodium and 0.569 gram of titanium tetrachloride suspended or dissolved in 400 milliliters of benzene. The sodium was charged as chunks of metal which had been freshly cut and washed with benzene. The reactor was pressured with ethylene to 225 p.s.i.g. at 70° F. and the system closed in. The temperature was increased to 325° F. gradually over a period of 3 hours, 10 minutes, at the end of which time the pressure was approximately 500 p.s.i.g. The closed system was allowed to rock overnight. In the morning the temperature was about 320° F. and the pressure was approximately 400 p.s.i.g. Since the pressure of the ethylene on the supply side of the valve was approximately 1000 p.s.i.g. it is possible that some ethylene continued to leak into the reactor during the rocking period. After venting the reactor, 600 milliliters of isopropyl alcohol was added to the suspension of polyethylene. This total mixture was stirred in a Waring Blendor for approximately one hour. The polymer was separated from the benzene and alcohol by filtration and was then washed with 400 milliliters of water for 30 minutes in a Waring Blendor. After drying for 5 hours in a vacuum oven at 650° C. and 28" of mercury vacuum, 45 grams of a white finely divided polymer was obtained.

The polymers and copolymers produced in accordance with this invention have utility in applications where solid plastics are used. They can be molded to form articles of any desired shape, such as bottles and other containers for liquids. Also, they can be formed into pipe or tubing by extrusion.

As will be evident to those skilled in the art, many variations and modifications can be practiced within the scope of the disclosure and claims to this invention. The invention resides in an improved polymerization process for olefins, as described herein, comprising the use of a mixture of an organic halide, a Group IV metal halide and a metal selected from the group consisting of sodium, potassium, lithium, rubidium, cesium, beryllium, magnesium, zinc, cadmium, mercury, aluminum, gallium, indium and thallium as a catalyst composition for the process and the polymers so produced.

I claim:

1. A method for polymerizing an aliphatic 1-olefin having up to and including 8 carbon atoms per molecule which comprises contacting said olefin with a catalyst which forms on mixing components consisting essentially of ethyl bromide, magnesium, aluminum and titanium tetrachloride, the ratio of the amounts of the components in said catalyst being in the range of from 0.02 to 50 mols of said ethyl bromide per mol of said titanium tetrachloride and from 0.02 to 50 mols of said magnesium and aluminum per mol of said titanium tetrachloride.

2. A method for polymerizing an aliphatic 1-olefin having up to and including 8 carbon atoms per molecule which comprises contacting said olefin with a catalyst which forms on mixing components consisting essentially of ethyl bromide, aluminum and titanium tetrachloride, the ratio of the amounts of the components in said catalyst being in the range of from 0.02 to 50 mols of said ethyl bromide per mol of said titanium tetrachloride and from 0.02 to 50 mols of said aluminum per mol of said titanium tetrachloride.

3. A method for polymerizing an aliphatic 1-olefin having up to and including 8 carbon atoms per molecule which comprises contacting said olefin with a catalyst which forms on mixing components consisting essentially of ethyl bromide, sodium and titanium tetrachloride, the ratio of the amounts of the components in said catalyst being in the range of from 0.02 to 50 mols of said ethyl bromide per mol of said titanium tetrachloride and from 0.02 to 50 mols of said sodium per mol of said titanium tetrachloride.

4. A catalyst composition which forms on mixing components consisting essentially of ethyl bromide, magnesium, aluminum and titanium tetrachloride, the ratio of the amounts of the components in said mixture being in the range of from 0.02 to 50 mols of said ethylbromide per mol of said titanium tetrachloride and from 0.02 to 50 mols of said magnesium and aluminum per mol of said titanium tetrachloride.

5. A catalyst composition which forms on mixing components consisting essentially of ethyl bromide, aluminum and titanium tetrachloride, the ratio of the amounts of the components in said mixture being in the range of from 0.02 to 50 mols of said ethylbromide per mol of said titanium tetrachloride and from 0.02 to 50 mols of said aluminum per mol of said titanium tetrachloride.

6. A catalyst composition which forms on mixing components consisting essentially of ethyl bromide, sodium and titanium tetrachloride, the ratio of the amounts of the components in said mixture being in the range of from 0.02 to 50 mols of said ethylbromide per mol of said titanium tetrachloride and from 0.02 to 50 mols of said sodium per mol of said titanium tetrachloride.

References Cited in the file of this patent

UNITED STATES PATENTS

| | | |
|---|---|---|
| 2,271,956 | Ruthruff | Feb. 3, 1942 |
| 2,475,520 | Roedel | July 5, 1949 |
| 2,721,189 | Anderson et al. | Oct. 18, 1955 |
| 2,786,035 | Freimiller | Mar. 19, 1957 |
| 2,862,917 | Anderson et al. | Dec. 2, 1958 |
| 2,905,645 | Anderson et al. | Sept. 22, 1959 |

FOREIGN PATENTS

| | | |
|---|---|---|
| 874,215 | Germany | Apr. 20, 1953 |
| 534,888 | Belgium | Jan. 31, 1955 |
| 801,031 | Great Britain | Sept. 3, 1958 |